(12) United States Patent
Takano et al.

(10) Patent No.: US 8,180,300 B2
(45) Date of Patent: May 15, 2012

(54) WIRELESS COMMUNICATION APPARATUS, WIRELESS COMMUNICATION METHOD, AND COMPUTER PROGRAM

(75) Inventors: Hiroaki Takano, Saitama (JP); Ryou Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 12/474,710

(22) Filed: May 29, 2009

(65) Prior Publication Data
US 2010/0015928 A1    Jan. 21, 2010

(30) Foreign Application Priority Data
Jul. 15, 2008    (JP) .................. 2008-183621

(51) Int. Cl.
*H04B 17/00*    (2006.01)
(52) U.S. Cl. .................. 455/67.11; 455/562.1
(58) Field of Classification Search .................. 455/423, 455/424, 425, 67.11, 550.1, 561, 562.1, 101, 455/277.1; 370/334
See application file for complete search history.

(56) References Cited

U.S. PATENT DOCUMENTS

| 6,615,024 B1 | 9/2003 | Boros et al. | |
| 6,934,563 B2 * | 8/2005 | Raghothaman et al. ... | 455/562.1 |
| 7,633,905 B1 * | 12/2009 | Harel et al. .................... | 370/334 |
| 7,885,618 B1 * | 2/2011 | Karmi ........................... | 455/101 |
| 2008/0261534 A1 * | 10/2008 | Wang et al. ................ | 455/67.11 |

FOREIGN PATENT DOCUMENTS

| JP | 2002-514033 A | 5/2002 |
| JP | 2005-348235 A | 12/2005 |
| JP | 2005-348236 | 12/2005 |
| JP | 2006-33658 | 2/2006 |

OTHER PUBLICATIONS

U.S. Appl. No. 12/482,798, filed Jun. 11, 2009, Takano, et al.

* cited by examiner

*Primary Examiner* — Thanh Le
(74) *Attorney, Agent, or Firm* — Oblon, Spivak, McClelland, Maier & Neustadt, L.L.P.

(57) ABSTRACT

A wireless communication apparatus includes a plurality of antenna branches through which radio signals are transmitted and received; a calibration factor acquiring unit that acquires a calibration factor for compensating an unbalance of phase and amplitude between the antenna branches for every predetermined frequency band; a factor memory storing the calibration factor acquired for every predetermined frequency band; a reliability determining unit that determines a reliability of the calibration factor acquired by the calibration factor acquiring unit; and a calibration factor multiplying unit that reads out the calibration factor from the factor memory to multiply a transmission signal or a reception signal to be calibrated by the readout calibration factor.

12 Claims, 6 Drawing Sheets

WIRELESS COMMUNICATION APPARATUS, WIRELESS COMMUNICATION METHOD, AND COMPUTER PROGRAM

BACKGROUND OF THE INVENTION

1. Field of the Invention

The present invention relates to a wireless communication apparatus, a wireless communication method, and a computer program that use multiple antennas and that perform an antenna calibration process for compensating an unbalance of phase and amplitude between antenna branches. More particularly, the present invention relates to a wireless communication apparatus, a wireless communication method, and a computer program that are applied to a communication system processing broadband signals and that perform the calibration process of each antenna branch.

Specifically, the present invention relates to a wireless communication apparatus, a wireless communication method, and a computer program that are applied to a broadband communication system dividing each broadband signal into multiple subcarriers to process the broadband signal resulting from the division, as in Orthogonal Frequency Division Multiplexing (OFDM), and that perform the calibration process of each antenna branch. More particularly, the present invention relates to a wireless communication apparatus, a wireless communication method, and a computer program that are applied to a broadband communication system using multiple packet formats differing in the arrangement of each subcarrier on the frequency axis, as in Institute of Electrical and Electronics Engineers (IEEE) 802.11n, and that perform the calibration process of each antenna branch.

2. Description of the Related Art

Wireless networks draw attention as systems that are free from wiring in wired communication methods in related art. Typical standards concerning the wireless networks include IEEE 802.11 and IEEE 802.15. For example, the OFDM modulation method, which a multi-carrier method, is adopted in IEEE 802.11a/g as a standard for a wireless local area network (LAN). Although the modulation method capable of achieving a communication speed up to 54 megabits per second (Mbps) is supported in the IEEE 802.11a/g, a next-generation wireless LAN standard capable of realizing a higher bit rate is demanded.

Wireless communication technologies capable of realizing high-throughput wireless data transmission include a multi-antenna technology in which a communication apparatus includes multiple antennas. An adaptive array antenna is in widespread use as an example of the multi-antenna technology. The adaptive array antenna is a method in which the gain of each antenna element is controlled to achieve the antenna directivities appropriate for transmission and reception in order to support the communication. Specifically, in the adaptive array antenna, a signal received by each antenna element in the array antenna is weighted by using an appropriate weighting factor to control the reception directivity pattern of the entire array antenna. In addition, each transmission signal is weighted by using a weighting factor appropriate for each antenna element and the transmission signal is transmitted through the antenna element to control the transmission directivity pattern of the entire array antenna. The array antenna is realized by a method using sector antennas, in which the main robe of each antenna is directed only to a desired direction and a radio wave is not unnecessarily radiated to a direction that is not desired by suppressing the level of side robes, or by a method in which the main robe is directed to a desired mobile station and null is directed to an interference station to improve the Signal to Interference plus Noise Ratio (SINR).

Multi-Input Multi-Output (MIMO) communication draws attention as another example of the multi-antenna wireless communication technology. The MIMO is a communication method in which multiple antennas are provided in both of the transmitter and the receiver to realize spatial multiplexing streams. At the side of the transmitter, multiple transmission data items are multiplexed by space-time coding and the transmission data items are distributed between multiple transmission antennas to transmit the transmission data items through channels. In contrast, at the side of the receiver, reception signals received through multiple reception antenna through the channels are separated into multiple transmission data items by space-time decoding to obtain original data without crosstalk between the streams. With the MIMO communication method, it is possible to increase the transmission capacity in accordance with the number of antennas without expanding the frequency band to increase the communication speed. In addition, since the spatial multiplexing is used, a higher efficiency of the frequency usage is achieved. The MIMO is a communication method using channel characteristics and differs from a simple transmission-reception adaptive array. For example, IEEE 802.11n resulting from expansion of the IEEE 802.11 adopts an OFDM-MIMO communication method.

Any multi-antenna technology has a problem in that, when a radio-frequency (RF) signal passes through an RF transmission circuit or an RF reception circuit, an effect of the individual difference between active elements or parts, such as amplifiers and frequency converters, composing the circuit appears as an unbalance of phase and amplitude between the antenna branches. Particularly, the individual difference between automatic gain control (AGC) circuits in the RF reception circuit and the individual difference between power amplifiers (PAs) in the RF transmission circuit produce greater effects. The unbalance of phase and amplitude between the antenna branches can cause degradation of the antenna characteristics in the adaptive array to from a directivity that is not desired. In addition, the unbalance of phase and amplitude between the antenna branches can cause mis-recognition of the channels and can inhibit acquisition of an appropriate transmission beamforming matrix in the MIMO communication, thus greatly degrading the decoding characteristics at the side of the receiver.

In order to prevent an occurrence of the unbalance of phase and amplitude between the antenna branches, it is necessary to perform calibration so that the same characteristics are achieved in the RF transmission circuit and the RF reception circuit. The calibration is generally performed in the frequency domain. A calibration factor is multiplied in the frequency domain for every subcarrier in each branch.

In a communication system processing broadband signals, it is necessary to acquire the calibration factor for every frequency band that is used. For example, the OFDM is a modulation method in which Fast Fourier Transform (FFT) is used to divide each broadband signal into multiple subcarriers and process the broadband signal resulting from the division, as described above. In this case, the antenna calibration factor is calculated for each subcarrier. Specifically, a transfer function is acquired in transmission and reception of packets including all the corresponding subcarriers to calculate the antenna calibration factor for each subcarrier corresponding to the transfer function.

For example, an array-antenna transmission apparatus is proposed, in which the entire frequency bandwidth is divided into multiple blocks and the average of the deviations in amplitude and phase between all the subcarriers in the blocks is calculated by using a fact that the deviation of the frequency response between adjacent subcarriers is small to obtain a more precise calibration value (for example, refer to Japanese Unexamined Patent Application Publication No. 2005-348236).

If packets are transmitted and received between other terminals in the same frequency band in which the antenna calibration is performed, wrong calibration factors can possibly be acquired due to the interference of the transmission and reception of the packets between the other terminals.

In such a case, the interference can be avoided by requesting the other terminals to stop the communication for a certain time period and, then, performing the antenna calibration. For example, a wireless communication system is proposed, in which a Clear to send (CTS)-to-Self signal is transmitted to temporarily stop the transmission by the peripheral stations and a bandwidth in which calibration signals are broadcast is allocated to perform the calibration with no interference from other stations (for example, refer to Japanese Unexamined Patent Application Publication No. 2006-33658). However, since a terminal where the packet for requesting the stop of the communication does reach can perform the communication, the interference may not fully avoided.

Practically, since a gain of only a few decibels is lost even if the antenna calibration factors that are wrongly acquired are used for the communication, it is highly likely that the communication terminal that has performed the antenna calibration does not immediately recognize the wrong calibration factors. However, since the effect of the antenna calibration factors that have been acquired continues for a few hours to one day, continuous use of the wrong calibration factors can produce a greater effect.

SUMMARY OF THE INVENTION

It is desirable to provide an excellent wireless communication apparatus, wireless communication method, and computer program that use multiple antennas and that are capable of preferably performing an antenna calibration process for compensating an unbalance of phase and amplitude between antenna branches.

It is also desirable to provide an excellent wireless communication apparatus, wireless communication method, and computer program that are applied to, for example, a communication system processing broadband signals and that are capable of preferably performing the calibration process of each antenna branch.

It is also desirable to provide an excellent wireless communication apparatus, wireless communication method, and computer program that are applied to a broadband communication system dividing each broadband signal into multiple subcarriers to process the broadband signal resulting from the division, as in the OFDM, and that are capable of preferably performing the calibration process of each antenna branch.

It is also desirable to provide an excellent wireless communication apparatus, wireless communication method, and computer program capable of preferably determining the reliability of the calibration factor acquired from the calibration process of each antenna branch.

It is also desirable to provide an excellent wireless communication apparatus, wireless communication method, and computer program capable of improving the reliability of the calibration factor acquired from the calibration process of each antenna branch.

According to an embodiment of the present invention, a wireless communication apparatus includes a plurality of antenna branches through which radio signals are transmitted and received; a calibration factor acquiring unit that acquires a calibration factor for compensating an unbalance of phase and amplitude between the antenna branches for every predetermined frequency band; a factor memory storing the calibration factor acquired for every predetermined frequency band; a reliability determining unit that determines a reliability of the calibration factor acquired by the calibration factor acquiring unit; and a calibration factor multiplying unit that reads out the calibration factor from the factor memory to multiply a transmission signal or a reception signal to be calibrated by the readout calibration factor.

According to the above embodiment of the present invention, the reliability determining unit determines the reliability of the calibration factor acquired by the calibration factor acquiring unit. If it is determined that the calibration process fails on the basis of the result of the reliability determination, for example, the calibration factor acquiring unit performs the acquisition of the calibration factor again to avoid an adverse effect of continuous use of the wrong calibration factor.

When the wireless communication apparatus is applied to a multi-carrier communication system including subcarriers over the predetermined frequency band, it is necessary to acquire the calibration factor for every frequency of each subcarrier. The calibration factor normally has the continuity in the direction of the frequency axis. Accordingly, the reliability determining unit can accurately determine the reliability of the calibration factor on the basis of whether the calibration factors acquired by the calibration factor acquiring unit are continuous in the direction of the frequency axis.

It is expected that the calibration factor of each antenna branch is not higher than a predetermined value. Accordingly, the reliability determining unit can accurately determine the reliability of the calibration factor on the basis of the value of the calibration factor estimated from a difference in gain between the antenna branches.

The wireless communication apparatus may further include a second factor memory storing the calibration factors which the calibration factor acquiring unit has acquired for every predetermined frequency band multiple times and an averaging unit that calculates an average of the multiple acquired calibration factors for every predetermined frequency band and stores the average in the factor memory. With this configuration, even if a wrong calibration factor is included in the multiple calibration factors, the effect of the wrong calibration factor is reduced owing to the averaging.

The wireless communication apparatus may further include a second factor memory storing the calibration factors which the calibration factor acquiring unit has acquired for every predetermined frequency band multiple times. The reliability determining unit may determine that the acquisition of the calibration factor fails if the calibration factor that is acquired is greatly deviated from the previous likelihood calibration factor value.

The wireless communication apparatus may further include a second factor memory storing the calibration factors which the calibration factor acquiring unit has acquired for every predetermined frequency band multiple times. The calibration factor acquiring unit may acquire the calibration factors multiple times at predetermined time intervals. The reliability determining unit may determine the reliability of the calibration factor on the basis of distribution of the multiple acquired calibration factors.

The calibration factor acquiring unit may acquire the calibration factors multiple times at predetermined time intervals. The wireless communication apparatus may further include a second factor memory storing the calibration factors which the calibration factor acquiring unit has acquired for every predetermined frequency band multiple times and an averaging unit that calculates an average of the multiple acquired calibration factors excluding an extreme value in the distribution and stores the average in the factor memory. With this configuration, it is possible to improve the reliability of the calibration factor.

According to another embodiment of the present invention, a wireless communication apparatus includes a plurality of antenna branches through which radio signals are transmitted and received; a calibration factor acquiring unit that acquires a calibration factor for compensating an unbalance of phase and amplitude between the antenna branches for every predetermined frequency band; a factor memory storing the calibration factor acquired for every predetermined frequency band; a reliability improving unit that performs a process for improving a reliability of the calibration factor acquired by the calibration factor acquiring unit to rewrite the content of the factor memory; and a calibration factor multiplying unit that reads out the calibration factor from the factor memory to multiply a transmission signal or a reception signal to be calibrated by the readout calibration factor.

The wireless communication apparatus may further includes a second factor memory storing the calibration factors which the calibration factor acquiring unit has acquired for every predetermined frequency band multiple times. The reliability improving unit may calculate an average of the multiple acquired calibration factors for every predetermined frequency band. With this configuration, even if the antenna calibration fails, the effect of the failed antenna calibration is reduced owing to the averaging.

The wireless communication apparatus may further include a second factor memory storing the calibration factors which the calibration factor acquiring unit has acquired for every predetermined frequency band multiple times. The reliability improving unit may calculate an average of the multiple acquired calibration factors excluding an extreme value in the distribution by using a fact that the calibration factors do not greatly varied with time.

According to another embodiment of the present invention, a wireless communication method in a wireless communication apparatus including a plurality of antenna branches through which radio signals are transmitted and received includes acquiring a calibration factor for compensating an unbalance of phase and amplitude between the antenna branches for every predetermined frequency band and storing the acquired calibration factor in a factor memory; determining a reliability of the acquired calibration factor; and reading out the calibration factor from the factor memory to multiply a transmission signal or a reception signal to be calibrated by the readout calibration factor.

According to another embodiment of the present invention, a computer program causing a computer to perform a wireless communication process in a wireless communication apparatus including a plurality of antenna branches through which radio signals are transmitted and received includes acquiring a calibration factor for compensating an unbalance of phase and amplitude between the antenna branches for every predetermined frequency band and storing the acquired calibration factor in a factor memory; determining a reliability of the acquired calibration factor; and reading out the calibration factor from the factor memory to multiply a transmission signal or a reception signal to be calibrated by the readout calibration factor.

The computer program according to the above embodiment of the present invention defines a computer program described in a computer-readable format so as to realize a predetermined process on the computer. In other words, the computer program according to the above embodiment present invention can be installed in a computer to perform a cooperative operation in the computer, thereby achieving the same operation and effect as in the wireless communication apparatus according to the above embodiment of the present invention.

It is possible to provide an excellent wireless communication apparatus, wireless communication method, and computer program that are applied to, for example, a communication system processing broadband signals and that are capable of preferably performing the calibration process of each antenna branch.

It is possible to provide an excellent wireless communication apparatus, wireless communication method, and computer program that are applied to a broadband communication system dividing each broadband signal into multiple subcarriers to process the broadband signal resulting from the division, as in the OFDM, and that are capable of preferably performing the calibration process of each antenna branch.

It is possible to provide an excellent wireless communication apparatus, wireless communication method, and computer program capable of preferably determining the reliability of the calibration factor acquired from the calibration process of each antenna branch.

It is possible to provide an excellent wireless communication apparatus, wireless communication method, and computer program capable of improving the reliability of the calibration factor acquired from the calibration process of each antenna branch.

The wireless communication apparatus, the wireless communication method, and the computer program according to the above embodiments of the present invention accurately determine the reliability of the calibration factor and perform the acquisition of the calibration factor again if it is determined that the calibration process fails, thereby avoiding an adverse effect of continuous use of the wrong calibration factor.

When the calibration factor is acquired for every frequency of each subcarrier in the multi-carrier communication, the reliability of the acquired calibration factor is accurately determined on the basis of the continuity of the calibration factor for every subcarrier.

The reliability of the calibration factor that is acquired is accurately determined on the basis of the value of the calibration factor estimated from a difference in gain between the antenna branches by using a fact that the calibration factor of each antenna branch is not higher than a predetermined value.

The average of the multiple acquired calibration factors is calculated for every predetermined frequency band. Accordingly, even if the antenna calibration fails, the effect of the wrong antenna calibration factor is reduced owing to the averaging.

It is determined that the acquisition of the calibration factor fails if the calibration factor that is acquired is greatly deviated from the previous likelihood calibration factor value on the basis of the fact that the calibration factors do not greatly varied with time.

The reliability of the calibration factor is accurately determined on the basis of distribution of the multiple acquired calibration factors by using the fact that the calibration factors do not greatly varied with time.

The average of the multiple acquired calibration factors is calculated for every frequency band excluding an extreme value in the distribution by using the fact that the calibration factor of each antenna branch is not higher than a predetermined value, thereby improving the reliability of the calibration factor.

The embodiments of the present invention are applicable not only to the self calibration using the loopback of packets between the antennas in its own terminal but also to the pairwise calibration in which packets are exchanged between two terminals to perform the calibration.

A combination of the above calibration methods may be used.

Further features of the present invention will become apparent from the following description of exemplary embodiments with reference to the attached drawings.

DESCRIPTION OF THE PREFERRED EMBODIMENTS

Embodiments of the present invention will herein be described with reference to the attached drawings.

The present invention concerns an antenna calibration method for compensating an unbalance of phase and amplitude between antenna branches in multi-antenna communication, such as the MIMO communication or the adaptive array, which is wireless communication using multiple antennas.

The antenna calibration method is broadly classified into, for example, out-device calibration and in-device calibration. The out-device calibration is also called pairwise calibration in which packets are exchanged between two terminals to perform the calibration. The in-device calibration is also called self-calibration using loopback of packets between the antennas of its own terminal. In either calibration, a reference signal is compared with the original reference signal to detect a variation in characteristics between transmission and reception systems each including an antenna and a propagation path and calibration factors are calculated on the basis of the detected variation. The present invention is applicable to both of the pairwise calibration and the self calibration.

The out-device calibration has a problem in that the out-device calibration is likely to be affected by the surrounding environment and the signal-to-noise ratio because it is necessary to provide a calibration antenna, in addition to the array antenna, and the reference signal that is returned through the propagation path is received. Accordingly, the inventors suppose that the self calibration in which the calibration is completed in the communication apparatus is preferred.

Figure 1:
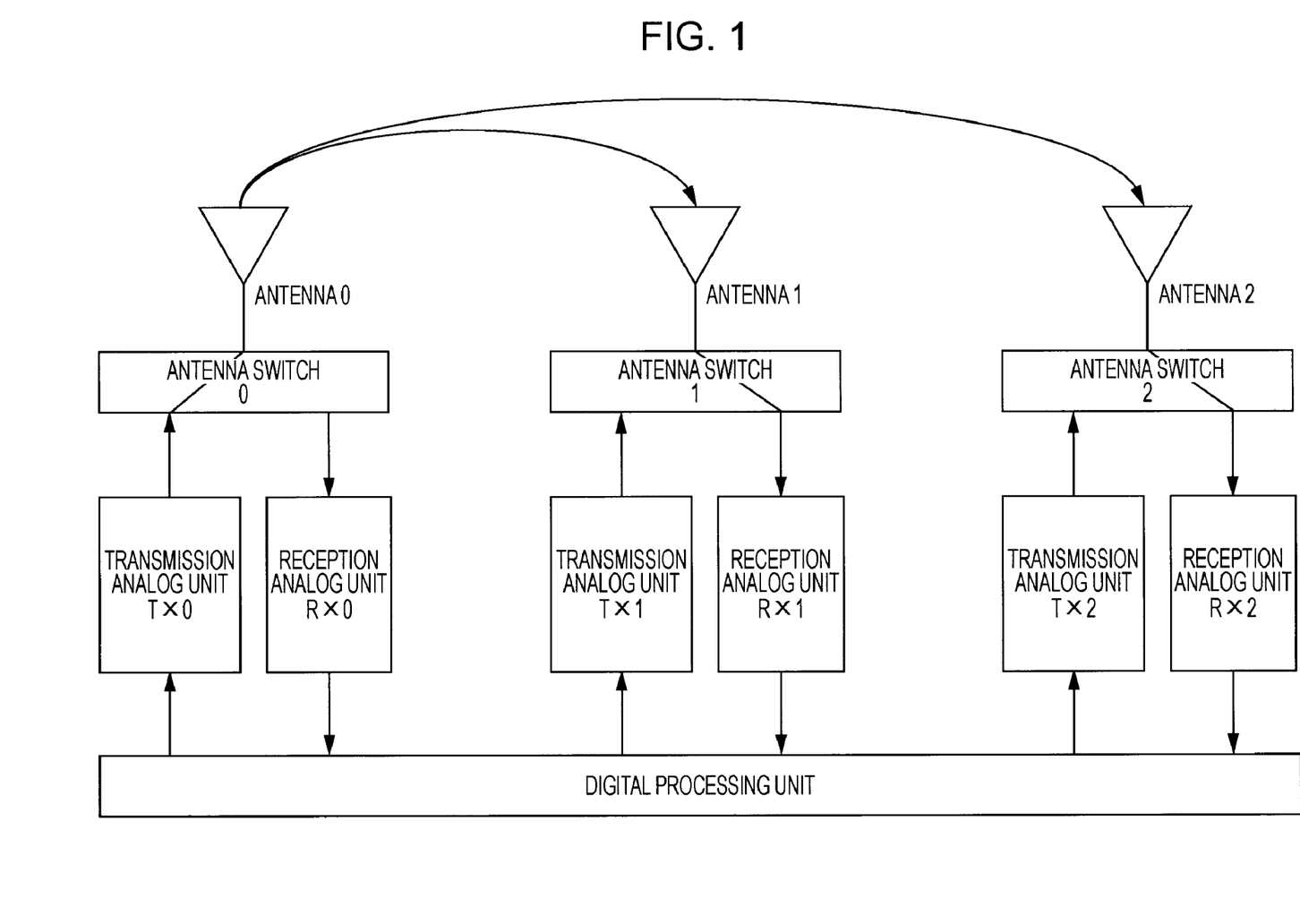
FIG. 1 illustrates an example of a process of calculating a correction factor for compensating an unbalance of phase and amplitude between branches by self calibration in multi-antenna communication.
Figure 2:
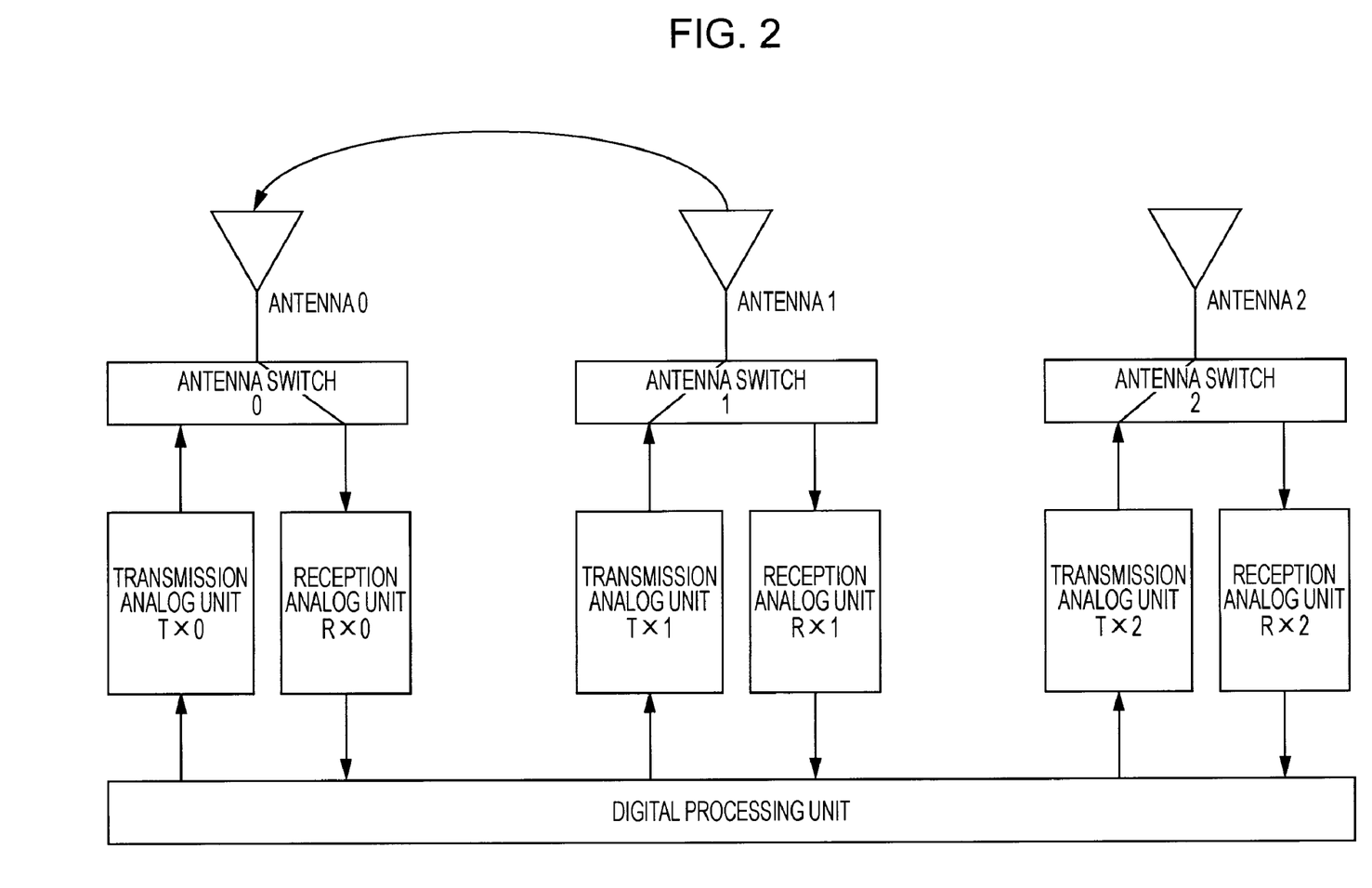
FIG. 2 illustrates another example of the process of calculating a correction factor for compensating an unbalance of phase and amplitude between branches by the self calibration in the multi-antenna communication.
Figure 3:
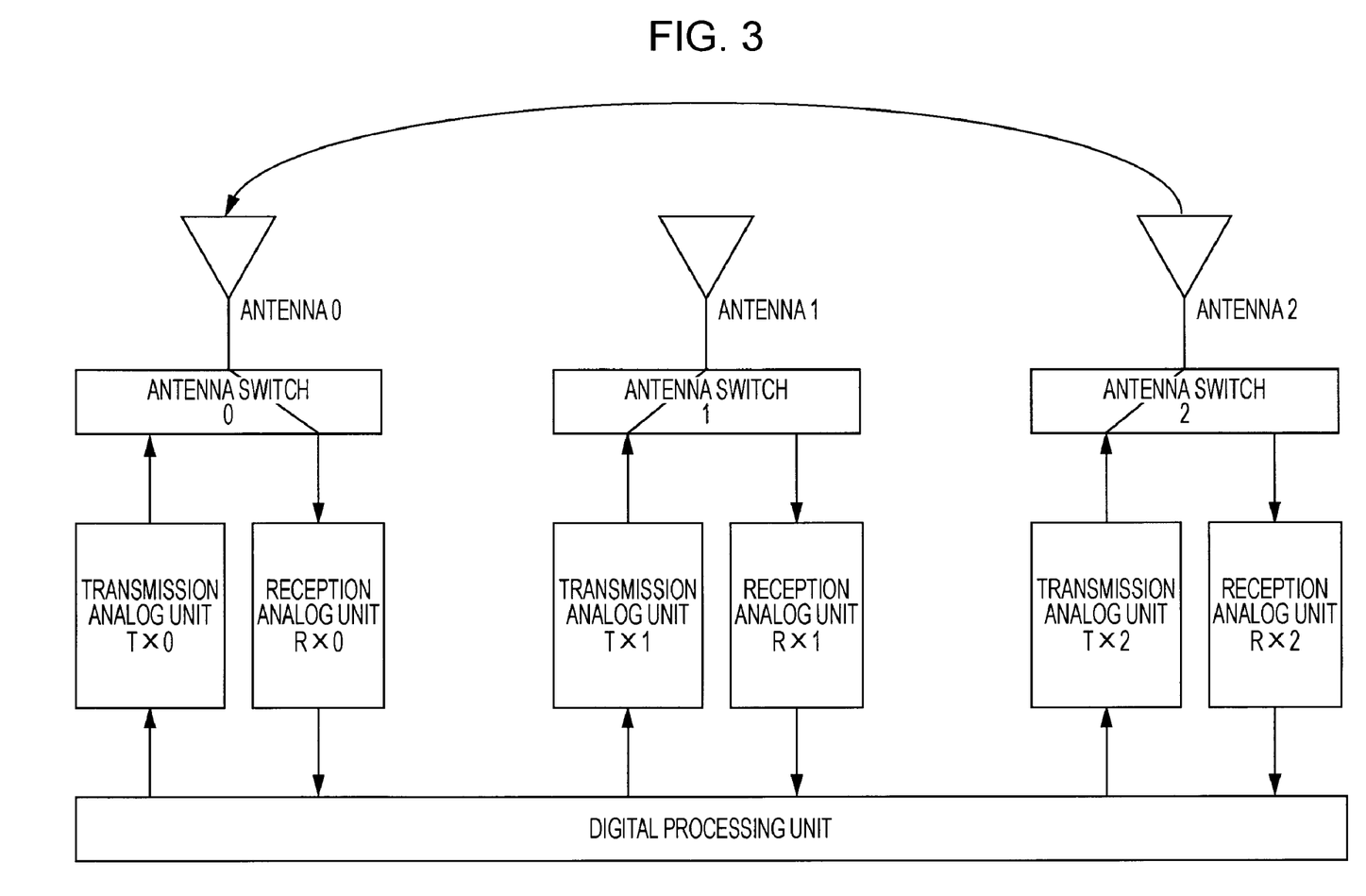
FIG. 3 illustrates another example of the process of calculating a correction factor for compensating an unbalance of phase and amplitude between branches by the self calibration in the multi-antenna communication.

FIGS. 1 to 3 are block diagrams showing examples of the configuration of a wireless communication apparatus including three transmission-reception braches. A process of calculating a calibration factor for compensating an unbalance of phase and amplitude between branches by the self calibration will now be described with reference to FIGS. 1 to 3. Referring to FIGS. 1 to 3, "i" denotes a branch number, "Tx(i)" denotes the transfer function of a transmission analog unit belonging to the i-th branch, and "Rx(i)" denotes the transfer function of a reception analog unit belonging to the i-th branch.

The calibration is performed by a digital processing unit that multiplies a transmission signal by a calibration factor K(i) so that the transfer function of the transmission analog unit is compensated. The calibration factor K(i) is used as a correction value of the antenna of each branch. If the ratio between the transfer function of the transmission analog unit and the transfer function of the reception analog unit is constant among the branches, as shown in Equation (1), it is determined that the calibration is completed:

$$\frac{T_x(0) \times K(0)}{R_x(0)} = \frac{T_x(1) \times K(1)}{R_x(1)} = \frac{T_x(2) \times K(2)}{R_x(2)} \quad (1)$$

In the self calibration, a signal is returned in the communication apparatus including multiple antennas to calculate the calibration factor. For example, when the calibration is performed by using the 0-th transmission-reception branch as the reference branch, the loopback transfer functions of paths from a branch 0 to the remaining branches 1 and 2 and the loopback transfer functions of paths from the branches 1 and 2 to the branch 0 are calculated according to Equations (2):

$$D(0,1) = T_x(0) \times R_x(1)$$

$$D(0,2) = T_x(0) \times R_x(2)$$

$$D(1,0) = T_x(1) \times R_x(0)$$

$$D(2,0) = T_x(2) \times R_x(0) \quad (2)$$

where "D(i,j)" denotes the loopback transfer function of a path from a transmission branch i to a reception branch j.

When the calibration factor K(0) of the branch 0, which is the reference branch, is set to a reference value of 1.0, the calibration factors of the branches 0 to 2 are expressed according to Equations (3):

$$K(0) = 1.0 \quad (3)$$

$$K(1) = \frac{D(0,1)}{D(1,0)} = \left\{\frac{R_x(1)}{T_x(1)}\right\} \times \left\{\frac{R_x(0)}{T_x(0)}\right\}$$

$$K(2) = \frac{D(0,2)}{D(2,0)} = \left\{\frac{R_x(2)}{T_x(2)}\right\} \times \left\{\frac{R_x(0)}{T_x(0)}\right\}$$

Verification based on Equation (1) shows that the condition of the calibration in which the ratio between the transfer function of the transmission analog unit and the transfer function of the reception analog unit is constant among the branches is satisfied, as shown in Equations (4):

$$\frac{T_x(0) \times K(0)}{R_x(0)} = \frac{T_x(0)}{R_x(0)} \quad (4)$$

$$\frac{T_x(1) \times K(1)}{R_x(1)} = \frac{T_x(0)}{R_x(0)}$$

$$\frac{T_x(2) \times K(2)}{R_x(2)} = \frac{T_x(0)}{R_x(0)}$$

Since the calibration is performed on the basis of the 0-th branch, the calibration factor K(0) of the 0-th branch is equal to 1.0, as shown in Equations (3). The calibration factor K(i) of a branch other than the 0-th branch has a value resulting from multiplication by {Tx(0)/Rx(0)} of the 0-th branch.

The calibration is generally performed in the frequency domain. Accordingly, the calibration factor K(i) is multiplied in the frequency domain for every subcarrier in each branch.

In the process of the self calibration, the loopback in which a reference signal is transmitted from the reference branch to another branch is called "forward loopback" and the loopback in which a reference signal returned from another branch is received by the reference branch is called "backward loopback".

In the self calibration, the loopback transfer functions resulting from the return of signals in the communication apparatus including multiple antennas are used to calculate the calibration factors. Specifically, after a certain branch is set as the reference branch, the forward loopback transfer function of the path from the reference branch to each branch other than the reference branch and the backward loopback transfer function of the path from each branch other than the reference branch to the reference branch are acquired to calculate the calibration factors of the respective branches including the reference branch on the basis of the acquired loopback transfer functions. FIG. 1 illustrates an example of how to perform the forward loopback in the wireless communication apparatus including the three transmission-reception branches from the branch 0 to the branch 2. FIGS. 2 and 3 illustrate examples of how to perform the backward loopback in the wireless communication apparatus including the three transmission-reception branches from the branch 0 to the branch 2.

The branches 0 to 2 include transmission analog units Tx0 to Tx2 and reception analog units Rx0 to Rx2, respectively. Connection to antennas 0 to 2 is switched with antenna switches 0 to 2 in response to the transmission or reception timing of a reference signal. The digital processing unit performs digital processing to transmission and reception signals through the transmission-reception branches 0 to 2.

Each transmission analog unit performs RF processing to a transmission signal subjected to digital-to-analog conversion to up-convert the transmission signal into an appropriate frequency band and transmits the transmission signal resulting from the up-conversion to the propagation path through the antenna switch and the antenna. For example, in the case of the MIMO communication, the transmission signal is transmitted to the propagation path from each antenna by spatial multiplexing. Each reception analog unit performs RF processing to a radio signal received with each antenna to down-convert the radio signal.

In the examples shown in FIGS. 1 to 3, the branch 0 is set as the reference branch. Specifically, in the example shown in FIG. 1, forward loopback paths are formed in which the antenna is connected to the transmission branch only in the branch 0, the antennas are connected to the reception branches in the remaining branches 1 and 2, and reference signals transmitted from the branch 0 are received by the remaining branches 1 and 2. The digital processing unit acquires each forward loopback transfer function.

In the examples shown in FIGS. 2 and 3, backward loopback paths are formed in which the antenna is connected to the reception branch only in the branch 0, the antennas are sequentially connected to the transmission branches in the remaining branches 1 and 2, and reference signals transmitted from the branches 1 and 2 are received by the branch 0. The digital processing unit acquires each backward loopback transfer function.

Although the reference signal is transmitted from the antenna in order to acquire a loopback signal in the examples in FIGS. 1 to 3, a return unit for return from the transmission analog unit to the reception analog unit, which is common to the branches, may be provided between the antenna switches and the transmission and reception analog units. In this case, the loopback is performed in the analog circuit without transmitting a radio signal from the antenna.

The digital processing unit performs digital processing to transmission and reception signals in the transmission and reception branches 0 to 2. The digital processing unit according to the embodiment of the present invention acquires the forward loopback transfer function and the backward loopback transfer function from the return of the reference signal to calculate the calibration factors K(0) to K(2) of the corresponding branches, which are used for compensating the transfer functions of the analog units, from the transfer functions. In the transmission of data, the transmission signals to the transmission branches are multiplied by the corresponding calibration factors K(0) to K(2) to perform the calibration so as to achieve reversibility.

When the wireless communication apparatus including multiple antennas is applied to a communication system processing broadband signals, it is necessary to acquire the calibration factor for every frequency band that is used. However, for example, if packets are transmitted and received between other terminals in the same frequency band in which the antenna calibration is performed, wrong calibration factors can possibly be acquired due to the interference of the transmission and reception of the packets between the other terminals.

Since a gain of only a few decibels is lost even if the antenna calibration factors that are wrongly acquired are used for the communication, it is highly likely that the communication terminal that has performed the antenna calibration does not immediately recognize the wrong calibration factors. However, since the effect of the antenna calibration factors that have been acquired continues for a few hours to one day, continuous use of the wrong calibration factors can produce a greater effect.

In order to resolve the above problems, according to the embodiment of the present invention, the reliability of the calibration factor resulting from the calibration process of each antenna branch is determined and, if it is determined that the calibration factor is wrongly acquired, the calibration process is performed again or a process for improving the reliability of the acquired calibration factor is performed. With this method, it is possible to eliminate the adverse effect of the continuous use of the wrong calibration factors even if the effect of the antenna calibration factor that has been acquired continues for a few hours to one day.

For example, the following five methods are available to determine the reliability of the calibration factor or to improve the reliability of the calibration factor.

(1) The reliability of the calibration factor is determined on the basis of the continuity of the calibration factors for every subcarrier in order to improve the reliability of the calibration factor that is acquired.

(2) The reliability of the calibration factor is determined on the basis of the value of the calibration factor estimated from the difference in gain between the antenna branches by using a fact that the calibration factor of each antenna branch is not higher than a predetermined value.

(3) The antenna calibration factors are acquired multiple times and the average of the acquired antenna calibration factors is used as the calibration factor. The averaging is performed for every subcarrier in each branch. Even if an antenna calibration factor that is wrongly acquired is included in the multiple antenna calibration factors, the effect of the wrong antenna calibration factor is reduced owing to the averaging.

(4) The calibration factor having a value that is greatly deviating from the previous likelihood calibration-factor value is determined to be wrong on the basis of a fact that the calibration factors do not greatly varied with time.

(5) The antenna calibration factors are acquired multiple times at predetermined time intervals and the average of the acquired calibration factors excluding an extreme value in the distribution is calculated to improve the reliability.

The above methods (1) to (5) will now be described in detail.

Method (1)

Figure 4:
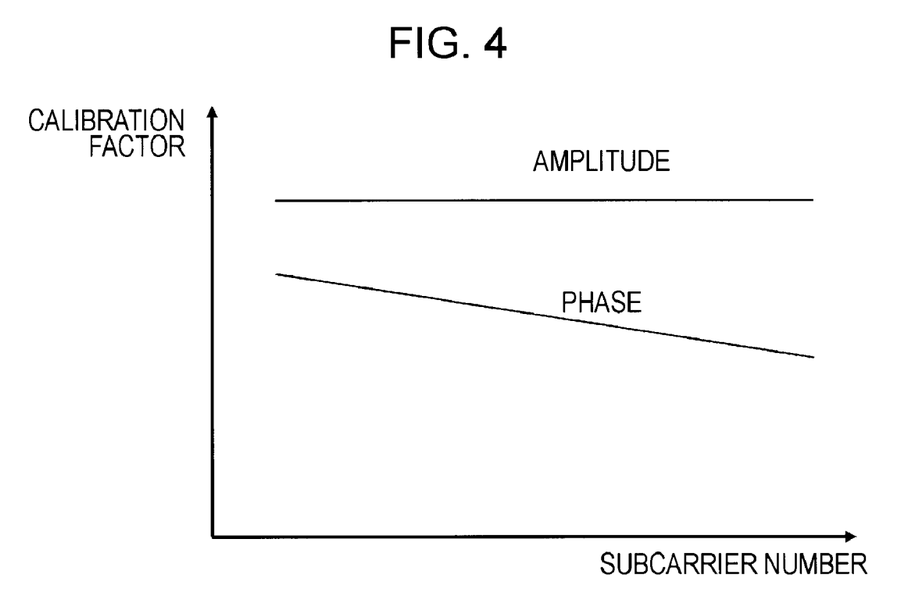
FIG. 4 is a graph showing an example of a calibration factor of one branch.

FIG. 4 is a graph illustrating an example of the calibration factor of one branch. The calibration factor is composed of the amount of amplitude correction and the amount of phase correction for every frequency band that is used. A communication apparatus including three antenna branches has three sets of the above data.

In the calibration factor of one branch, the amplitude is expected to be fairly constant with the varying subcarrier number (frequency band) on the horizontal axis. Although the phase is varied with the subcarrier number, the continuity on the frequency axis is kept.

Accordingly, if a variation exceeding a predetermined value is observed in the continuity in the calibration factor that is acquired for every subcarrier, it is determined that the calibration factor is not reliable and the acquired calibration factor is discarded.

The variation exceeding a predetermined value means, for example, a shift from the average calculated from three adjacent values by the predetermined value.

Method (2)

On the assumption that the variations in the gain between the antenna branches in the RF analog circuit module are 3 dB or less at both the transmission side and the reception side, as shown in Table 1, the variations between the calibration factors resulting from the variations in Table 1 are shown in Table 2:

TABLE 1

Examples of variations in gain between branches (worst cases)

| Branch | RF gain [dB] | RF gain [linear] |
|---|---|---|
| T × 1 | −3 | 0.707946 |
| R × 1 | 3 | 1.412538 |
| T × 2 | 3 | 1.412538 |
| R × 2 | −3 | 0.707946 |
| T × 3 | 3 | 1.412538 |
| R × 3 | −3 | 0.707946 |

TABLE 2

Antenna calibration factors relative to worst cases

| Factor | Before normalization | Power | After normalization | Power | Normalization factor [dB] |
|---|---|---|---|---|---|
| 1 | 1 | 1 | 0.302901 | 0.091749 | −10.373981 |
| 2 | 3.981072 | 15.84893 | 1.205871 | 1.454125 | 1.62601874 |
| 3 | 3.981072 | 15.84893 | 1.205871 | 1.454125 | 1.62601874 |

Table 2 shows that the difference in the calibration factor between the antenna branches is only about 12 dB at worst. Accordingly, if the difference in the calibration factor between the antenna branches is 15 dB, it is determined that the acquired calibration factor is not reliable and the calibration factor is discarded.

Method (3)

The averaging is performed for every subcarrier in each branch. For example, the antenna calibration is performed five times in each branch, the five calibration factors are added together for every subcarrier in each branch and the result of the addition is divided by five to calculate the average, and the calculated average is used as the calibration factor for the corresponding branch.

Method (4)

The antenna calibration factor is normally varied with time gently, and the use of the same calibration factor for about half a day makes little difference. Accordingly, if the difference between the current calibration factor and the calibration factor before one hour is large when the calibration factor is acquired every hour, it is determined that the calibration fails and the calibration is performed again after the acquired calibration factor is discarded.

Method (5)

Figure 5:
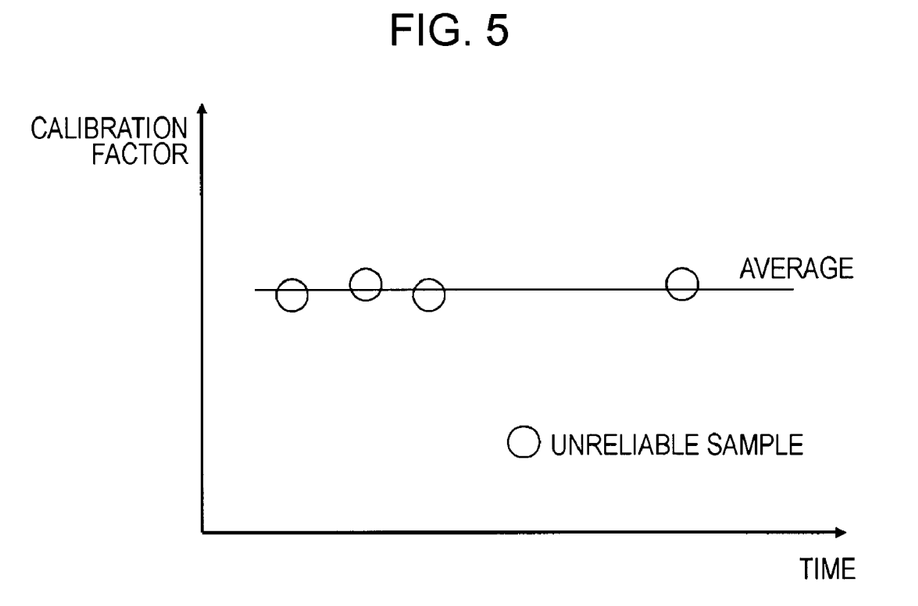
FIG. 5 is a graph showing an example of variation of the amplitude in the calibration factor with time, in which the horizontal axis represents time.

FIG. 5 is a graph showing an example of variation of the amplitude in the calibration factor with time. Referring to FIG. 5, the horizontal axis represents time. Five samples in FIG. 5 are taken at intervals of about ten minutes. Since the calibration factor shows little variation with time for about ten minutes, it is expected that the five samples have approximately the same value. However, in the example in FIG. 5, the amplitude of the calibration factor of one sample is greatly shifted from those of the other calibration factors. In this case, the sample whose amplitude is shifted from the average of the five samples by a predetermined value or higher is excluded and the average of the remaining four samples is calculated to improve the reliability.

The five methods (1) to (5) are applicable not only to the self calibration (refer to FIGS. 1 to 3) using the loopback of packets between the antennas in its own terminal but also to the pairwise calibration in which packets are exchanged between two terminals to perform the calibration.

A combination of the above methods (1) to (5) may be used. For example, the calibration method (1), (2), or (5) may be used for the first calibration process and the calibration method (4) may be used for the second and subsequent calibration processes.

Figure 6:
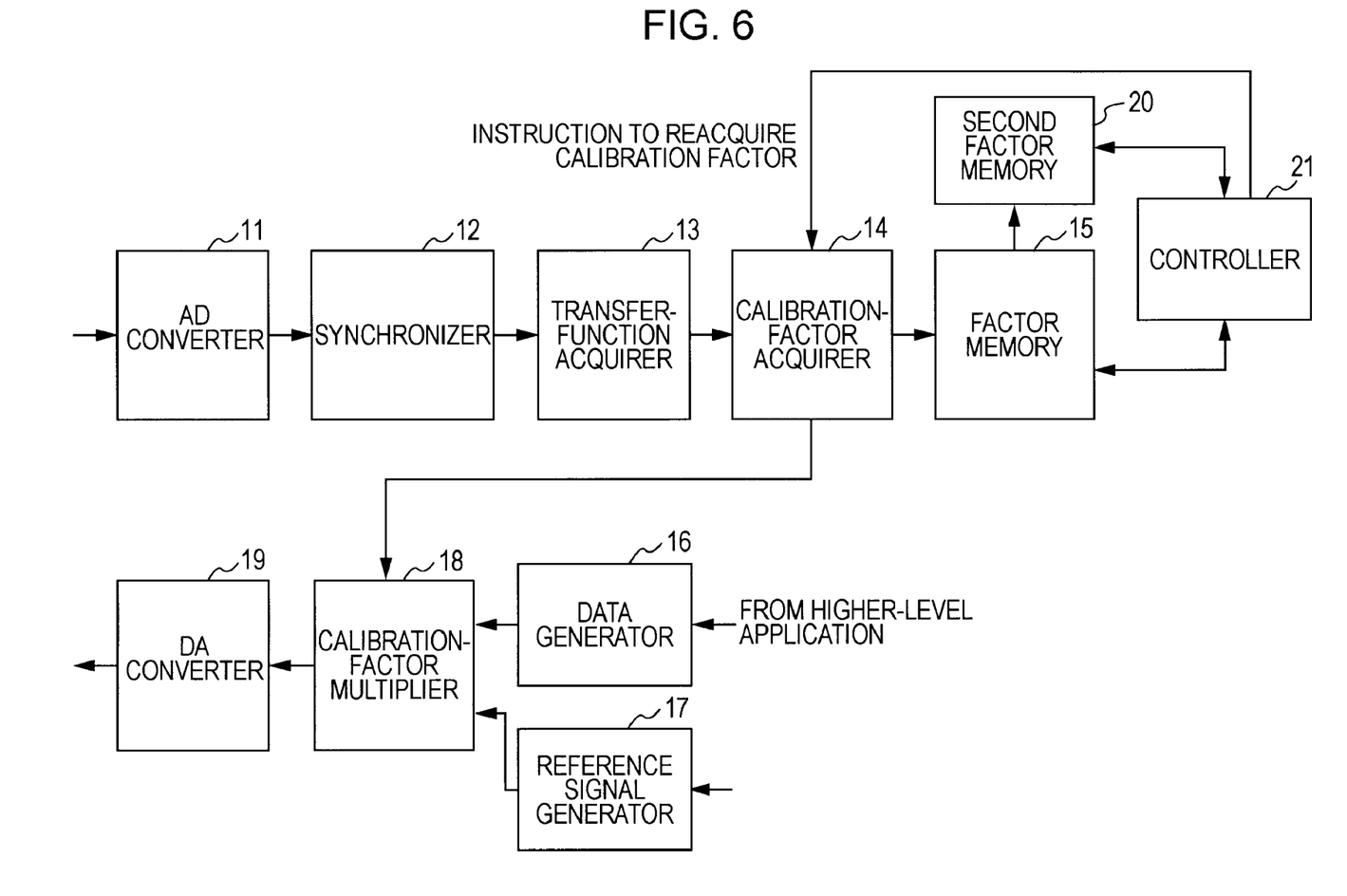
FIG. 6 is a block diagram showing an example of the internal configuration of a digital processing unit in a wireless communication apparatus shown in FIGS. 1 to 3.

FIG. 6 is a block diagram showing an example of the configuration of components that are provided in the digital processing unit in the wireless communication apparatus shown in FIGS. 1 to 3 and that mainly perform the calibration process. In the example shown in FIG. 6, the calibration process is performed in the transmission line.

The reception line in the digital processing unit shown in FIG. 6 includes an analog-to-digital (AD) converter 11, a synchronizer 12, a transfer-function acquirer 13, and a calibration-factor acquirer 14.

The AD converter 11 converts a baseband signal that is down-converted in the reception analog unit into a digital signal, and a digital filter (not shown) performs bandwidth restriction. Then, the synchronizer 12 performs detection of a packet, synchronization, noise estimation in frequency offset compensation, and so on. When the OFDM transmission method is adopted, an FFT processing unit (not shown) performs the FFT by the OFDM demodulation to convert a signal on the time axis to a signal on the frequency axis, demodulates each subcarrier in accordance with the modulation method of the subcarrier, and performs parallel-to-serial conversion to the demodulated signal to reproduce each reception sequence transmitted as the original serial signal.

In the calibration process phase, the transfer-function acquirer 13 multiplies reference signals returned from other branches by the same known signal to acquire the forward loopback transfer function and the backward loopback transfer function between the branches. The calibration-factor acquirer 14 uses these loopback transfer functions to acquire the calibration factors K(0) to K(2) of the analog units of the respective branches and stores the acquired calibration factors K(0) to K(2) in a factor memory 15.

When the wireless communication apparatus is applied to a broadband communication system that divides a broadband signal into multiple subcarriers and processes the broadband signal resulting from the division, as in the OFDM, the calibration-factor acquirer 14 acquires the calibration factor for every subcarrier in each branch.

A controller 21 determines the reliability of the calibration factors acquired by the calibration-factor acquirer 14 and performs a process for improving the reliability by the above methods (1) to (5). When the calibration factor is acquired multiple times for every subcarrier in each branch and the average of the calibration factors is calculated to improve the reliability, the calibration factors corresponding to the multiple times are stored in a second factor memory 20 to perform the averaging.

If it is determined that the acquired calibration factor is not reliable, for example, if the calibration factor has no continuity for every subcarrier, if the value of the calibration factor exceeds a predetermined value, or if a value that is greatly deviating from the previous likelihood calibration-factor value is acquired, the controller 21 instructs reacquisition of the calibration factor.

Since the processing operation of the reception line in the data reception phase in the example shown in FIG. 6 does not directly concern the present invention, a description is omitted herein.

The transmission line in the digital processing unit shown in FIG. 6 includes a data generator 16, a reference signal generator 17, a calibration factor multiplier 18, and a digital-to-analog (DA) converter 19.

The data generator 16 allocates transmission data supplied from a higher-level application to the transmission sequence of each branch. The reference signal generator 17 generates reference signals returned from and received by the branches in the calibration process phase.

The calibration factor multiplier 18 reads out the calibration factors K(0) to K(2) for every subcarrier corresponding to the packet format that is used from the factor memory 15 in the data transmission phase and multiplies the transmission signal to each transmission branch by the corresponding calibration factor to perform the calibration.

When the OFDM transmission method is adopted, the calibration process is performed in the frequency domain, multiple data items resulting from the serial-to-parallel conversion of each transmission sequence on a symbol cycle that is slower than the information transmission rate are allocated to the subcarriers to modulate the amplitude and phase of each subcarrier, and inverse FFT is performed for the subcarriers, thereby converting each subcarrier in the frequency domain into a signal on the time axis while keeping the orthogonality of the subcarrier. In addition, a digital filter (not shown) performs the bandwidth restriction.

An output from either of the data generator 16 and the reference signal generator 17 is supplied to the DA converter 19 in accordance with whether the transmission line is in the data transmission phase or the calibration process phase and the output signal is converted into an analog signal in the DA converter 19.

When the calibration factor multiplied by a transmission signal is transmitted, the calibration factor based on a branch having a larger output should be used in order to permit transmission spectrum mask. Accordingly, if the gain of each transmission branch is greatly varied, the power loss involved in the multiplication of the calibration factor is increased and, thus, the digital processing unit may be inferior in characteristics to an RF circuit chip having a smaller variation.

Figure 7:
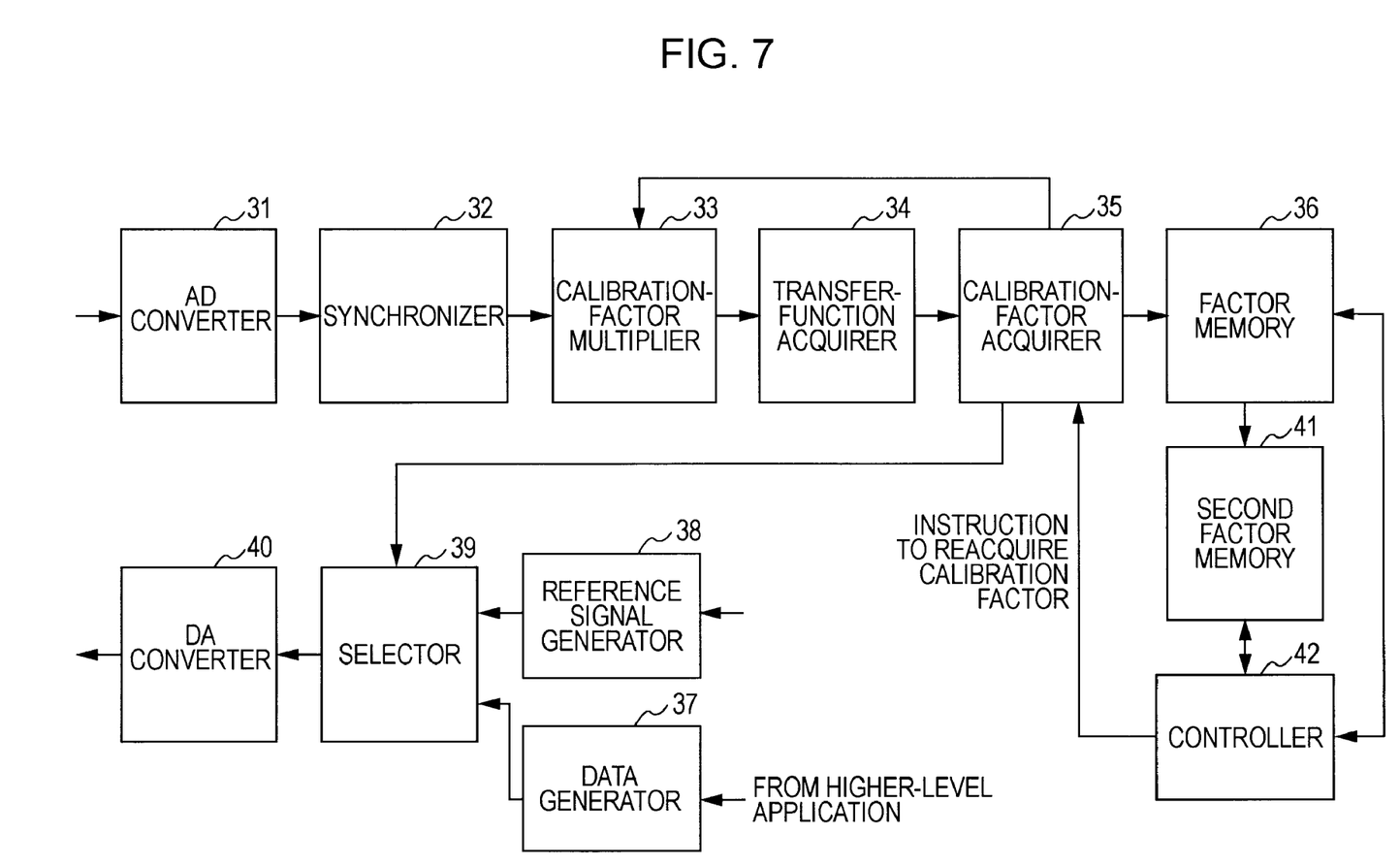
FIG. 7 is a block diagram showing another example of the internal configuration of the digital processing unit in the wireless communication apparatus shown in FIGS. 1 to 3.

FIG. 7 is a block diagram showing an example of the configuration of components that are provided in the digital processing unit in the wireless communication apparatus shown in FIGS. 1 to 3 and that mainly perform the calibration process. In the example shown in FIG. 7, the calibration process is performed in the reception line.

The transmission line in the digital processing unit in FIG. 7 includes a data generator 37, a reference signal generator 38, a selector 39, and a DA converter 40.

The data generator 37 operates in the data transmission phase and allocates transmission data supplied from a higher-level application to the transmission sequence of each branch. The reference signal generator 38 operates in the calibration process phase and generates reference signals returned from and received by the branches.

The selector 39 connects either of the data generator 37 and the reference signal generator 38 to the DA converter 40 in accordance with whether the transmission line is in the data transmission phase or the calibration process phase.

When the OFDM transmission method is adopted, multiple data items resulting from the serial-to-parallel conversion of each transmission sequence on a symbol cycle that is slower than the information transmission rate are allocated to the subcarriers to modulate the amplitude and phase of each subcarrier and the inverse FFT is performed for the subcarriers, thereby converting each subcarrier in the frequency domain into a signal on the time axis while keeping the orthogonality of the subcarrier. In addition, after a digital filter (not shown) performs the bandwidth restriction, the DA converter 40 converts the signal into an analog signal.

The reception line in the digital processing unit shown in FIG. 7 includes an AD converter 31, a synchronizer 32, a calibration factor multiplier 33, a transfer-function acquirer 34, and a calibration-factor acquirer 35.

The AD converter 31 converts a baseband signal that is down-converted in the reception analog unit into a digital signal, and a digital filter (not shown) performs bandwidth restriction. Then, the synchronizer 32 performs detection of a packet, synchronization, noise estimation in frequency offset compensation, and so on. When the OFDM transmission method is adopted, an FFT processing unit (not shown) performs the FFT by the OFDM demodulation to convert a signal on the time axis to a signal on the frequency axis, demodulates each subcarrier in accordance with the modulation method of the subcarrier, and performs the parallel-to-serial conversion to the demodulated signal to reproduce each reception sequence transmitted as the original serial signal.

In the calibration process phase, the transfer-function acquirer 34 multiplies reference signals returned from other branches by the same known signal to acquire the forward loopback transfer function and the backward loopback transfer function between the branches. The calibration-factor acquirer 35 uses these loopback transfer functions to acquire the calibration factors K(0) to K(2) of the analog units of the respective branches and stores the acquired calibration factors K(0) to K(2) in a factor memory 36.

When the wireless communication apparatus is applied to a broadband communication system that divides a broadband signal into multiple subcarriers and processes the broadband signal resulting from the division, as in the OFDM, the calibration-factor acquirer 35 acquires the calibration factor for every subcarrier in each branch.

A controller 42 determines the reliability of the calibration factors acquired by the calibration-factor acquirer 35 and performs a process for improving the reliability by the above methods (1) to (5). When the calibration factor is acquired multiple times for every subcarrier in each branch and the average of the calibration factors is calculated to improve the reliability, the calibration factors corresponding to the multiple times are stored in a second factor memory 41 to perform the averaging.

If it is determined that the acquired calibration factor is not reliable, for example, if the calibration factor has no continuity for every subcarrier, if the value of the calibration factor exceeds a predetermined value, or if a value that is greatly deviating from the previous likelihood calibration-factor value is acquired, the controller 42 instructs reacquisition of the calibration factor.

The calibration factor multiplier 33 operates in the data reception phase. The calibration factor multiplier 33 reads out the calibration factors K(0) to K(2) of each subcarrier corresponding to the packet format that is used from the factor memory 36 and multiplies the calibration factors by the reception signals of the corresponding reception branches to perform the calibration.

The present application contains subject matter related to that disclosed in Japanese Priority Patent Application JP 2008-183621 filed in the Japan Patent Office on Jul. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus comprising:
a plurality of antenna branches through which radio signals are transmitted and received;
a calibration factor acquiring unit that acquires a calibration factor for compensating an unbalance of phase and amplitude between the antenna branches for every predetermined frequency band;
a factor memory storing the calibration factor acquired for every predetermined frequency band;
a reliability determining unit that determines a reliability of the calibration factor acquired by the calibration factor acquiring unit; and
a calibration factor multiplying unit that reads out the calibration factor from the factor memory to multiply a transmission signal or a reception signal to be calibrated by the readout calibration factor.

2. The wireless communication apparatus according to claim 1,
wherein the wireless communication apparatus is applied to a multi-carrier communication system including subcarriers over the predetermined frequency band,
wherein the calibration factor acquiring unit acquires the calibration factor for every frequency of each subcarrier, and
wherein the reliability determining unit determines the reliability of the calibration factor on the basis of whether the calibration factors acquired by the calibration factor acquiring unit are continuous in the direction of a frequency axis.

3. The wireless communication apparatus according to claim 1,
wherein the reliability determining unit determines the reliability of the calibration factor on the basis of the value of the calibration factor estimated from a difference in gain between the antenna branches.

4. The wireless communication apparatus according to claim 1, further comprising:
a second factor memory storing the calibration factors which the calibration factor acquiring unit has acquired for every predetermined frequency band multiple times; and
an averaging unit that calculates an average of the multiple acquired calibration factors for every predetermined frequency band and stores the average in the factor memory.

5. The wireless communication apparatus according to claim 1, further comprising:
a second factor memory storing the calibration factors which the calibration factor acquiring unit has acquired for every predetermined frequency band multiple times,
wherein the reliability determining unit determines the reliability of the calibration factor on the basis of a deviation from the previous likelihood calibration factor.

6. The wireless communication apparatus according to claim 1, further comprising:
a second factor memory storing the calibration factors which the calibration factor acquiring unit has acquired for every predetermined frequency band multiple times,
wherein the calibration factor acquiring unit acquires the calibration factors multiple times at predetermined time intervals, and
wherein the reliability determining unit determines the reliability of the calibration factor on the basis of distribution of the multiple acquired calibration factors.

7. The wireless communication apparatus according to claim 1,
wherein the calibration factor acquiring unit acquires the calibration factors multiple times at predetermined time intervals, and
wherein the wireless communication apparatus further includes
a second factor memory storing the calibration factors which the calibration factor acquiring unit has acquired for every predetermined frequency band multiple times; and
an averaging unit that calculates an average of the multiple acquired calibration factors excluding an extreme value in the distribution and stores the average in the factor memory.

8. A wireless communication apparatus comprising:
a plurality of antenna branches through which radio signals are transmitted and received;

a calibration factor acquiring unit that acquires a calibration factor for compensating an unbalance of phase and amplitude between the antenna branches for every predetermined frequency band;

a factor memory storing the calibration factor acquired for every predetermined frequency band;

a reliability improving unit that performs a process for improving a reliability of the calibration factor acquired by the calibration factor acquiring unit to rewrite the content of the factor memory; and a calibration factor multiplying unit that reads out the calibration factor from the factor memory to multiply a transmission signal or a reception signal to be calibrated by the readout calibration factor.

9. The wireless communication apparatus according to claim 8, further comprising:

a second factor memory storing the calibration factors which the calibration factor acquiring unit has acquired for every predetermined frequency band multiple times, wherein the reliability improving unit calculates an average of the multiple acquired calibration factors for every predetermined frequency band.

10. The wireless communication apparatus according to claim 8, further comprising:

a second factor memory storing the calibration factors which the calibration factor acquiring unit has acquired for every predetermined frequency band multiple times, wherein the reliability improving unit calculates an average of the multiple acquired calibration factors excluding an extreme value in the distribution.

11. A wireless communication method in a wireless communication apparatus including a plurality of antenna branches through which radio signal are transmitted and received, the method comprising:

acquiring a calibration factor for compensating an unbalance of phase and amplitude between the antenna branches for every predetermined frequency band and storing the acquired calibration factor in a factor memory;

determining a reliability of the acquired calibration factor; and reading out the calibration factor from the factor memory to multiply a transmission signal or a reception signal to be calibrated by the readout calibration factor.

12. A non-transitory computer program storage device having instructions stored therein that when executed by a computer cause the computer to perform a wireless communication process in a wireless communication apparatus including a plurality of antenna branches through which radio signals are transmitted and received, the wireless communications process comprising:

acquiring a calibration factor for compensating an unbalance of phase and amplitude between the antenna branches for every predetermined frequency band and storing the acquired calibration factor in a factor memory;

determining a reliability of the acquired calibration factor; and reading out the calibration factor from the factor memory to multiply a transmission signal or a reception signal to be calibrated by the readout calibration factor.

* * * * *